E. HART.
Seed-Planter.
No. 7,544. Patented Aug. 6, 1850.
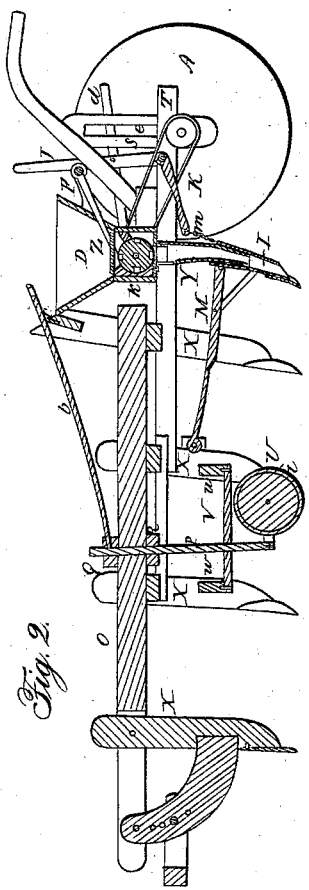
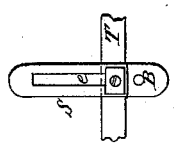
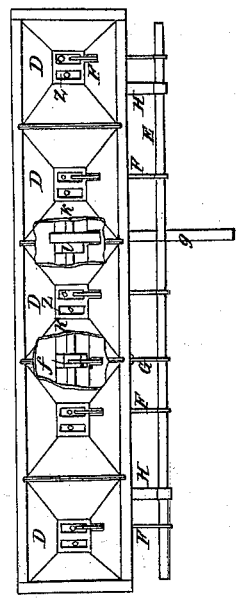
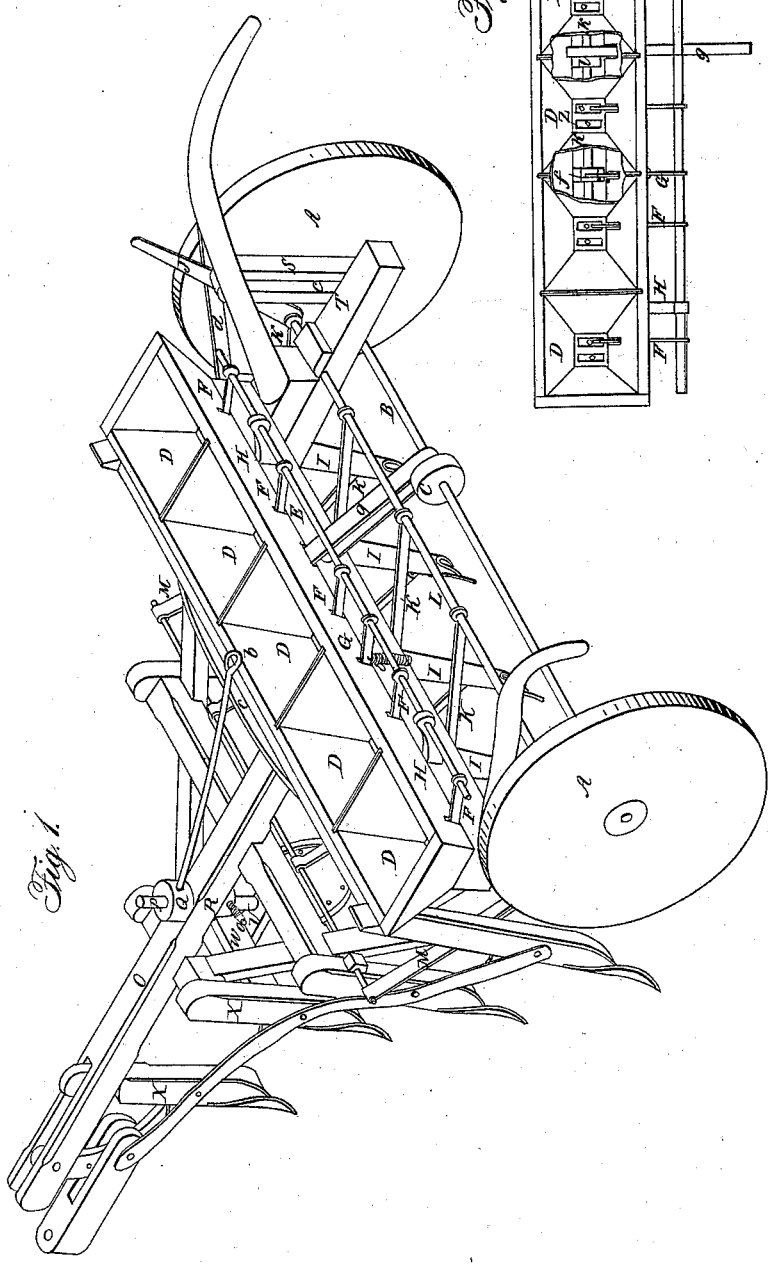

UNITED STATES PATENT OFFICE.

EDSON HART, OF NEW ALBANY, INDIANA.

IMPROVEMENT IN SEED-PLANTERS.

Specification forming part of Letters Patent No. 7,544, dated August 6, 1850.

*To all whom it may concern:*

Be it known that I, EDSON HART, of the city of New Albany, in the county of Floyd and State of Indiana, have invented a new and Improved Combination of a Planting Apparatus with a Cultivator; and I do hereby declare the following to be a full, clear, and exact description thereof, reference being had to the accompanying drawings, making a part of this specification, in which—

Figure 1 is a perspective view, and Fig. 2 a vertical longitudinal section, of a combined cultivator and planter; and Figs. 3 and 4 are plans of detached portions thereof.

Similar letters indicate like parts in all the figures.

The cultivator-frame may be constructed in the manner represented in the drawings, or in any other that may be deemed expedient. Upon the rear end of the cultivator-frame, I secure a planting apparatus, as represented in the drawings.

D D are the series of hoppers in which the grain or seeds are placed preparatory to planting. The kernels or seeds are deposited in drills by means of a roller, Z, with cavities in its periphery located in the bottom of each hopper, which rollers are secured to and rotate with the shaft $k$, Figs. 2 and 3. The seeds or kernels fall from the cavities in the rollers into flexible tubes $y$, placed within the metallic tubes I, which metallic tubes form the drills for their reception. The planting-tubes I I are all connected to the shaft N by means of the draft-bars M M, as shown in Figs. 1 and 2. The rear sides of the planting-tubes are also connected to the arms K K, projecting from the vibrating shaft L, by which they can all be elevated, so as to raise the points above the surface of the ground when necessary, by means of the lever J, rising from one end of L, in which elevated position they can be retained by a pin on the outer side of J (not shown) falling into a notch in the vibrating bar $d$, or by any other suitable catch. The planting-rollers Z Z are rotated by means of the band $g$, passing from the pulley C on the main driving-shaft B around a pulley on the shaft $k$ of the rollers, located between a couple of the hoppers, as shown in Fig. 3. The kernels of grain are agitated in the hoppers so as to insure the filling of every cavity in the rollers Z as they are rotated, by means of vibrating arms F F projecting from the shaft E through apertures in the rear sides of the hoppers, and terminating over the center of each planting-roller. The arms F F are vibrated by means of the cam-wheel $f$ on the shaft $k$, Fig. 3, acting upon the arm G, projecting forward from the shaft E, as shown in Figs. 1 and 3. The arm G is also operated upon by the spring $h$, which causes the series of arms F F to strike with a sharp blow upon the planting-rollers. The projections on the cam-wheel $f$ are so arranged with the cavities in the planting-rollers Z Z that the ends of each vibrating arm F will strike upon the rollers immediately in the rear of a cavity therein, serving to insure the filling of the uppermost cavities in the rollers as they revolve with seeds or kernels, and also at the same time to insure a full discharge of the contents of the cavities on the lower side of the rollers into the planting-tubes. The wheels A A are made fast to the ends of the shaft B, which shaft is connected to the cultivator-frame by means of the adjustable bearing-blocks S S. The blocks S S are connected to the side beams, T T, of the cultivator-frame by means of set-screws passing through the slots $e$ $e$ in the blocks into the beams, as represented in Fig. 4. A vertical shaft, P, is located in the front portion of the cultivator-frame, passing through the central beam, O, and the supporting-piece V, placed below beam, as shown in Figs. 1 and 2. The shaft P is raised or lowered in its bearings by means of the nut R under the beam O, and the nut Q above the beam, which nuts are secured in any desired position on the shaft by means of set-screws passing through apertures in their edges and pressing against the shaft. The nut R is retained in its place by the set-screw $a$, and the nut Q is retained in its place by a screw cut on the front end of the elastic guiding-handle $b$. The depth of the furrows made by the series of the cultivator-points is regulated by varying the position of the wheels A A and U; or the cultivating-points may be elevated entirely above the surface of the ground, and the planting apparatus be used independently of the cultivating apparatus. The planting apparatus can also be readily detached from the cultivator-frame when it is desired to use the cultivator without the planter. The wheel U serves not only for the purpose above set forth, but also to guide the cultivator in a straight line when passing along the side of a hill, or when the draft has to deviate from the line of the drills in consequence of an obstruction. The wheel U is retained in the proper position for guiding the cultivator by means of the elastic handle $b$, passing into a notch in the plate $c$, secured to and projecting above the front side of the hopper-boxes. When it is necessary to turn the cultivating and planting machine, the handle is thrown out of its retaining-notch to allow the wheel U to turn and adjust itself to the turning motion of the machine; and when the machine is drawn forward again in a straight line, the handle $b$ will pass up the inclined edge of the plate $c$ as the wheel comes into line, and will reset itself in the retaining-notch again.

To render the wheel U more efficient for guiding purposes, I secure thereto a metallic plate, $i$, which radiates from its periphery.

It will be perceived that I require no separate frame-work for my planting apparatus, but can readily arrange and combine it with the frame of an ordinary cultivator whenever its use is desired, and can as easily detach it again when the planting apparatus is no longer required.

Having thus fully described my improved combination of a planting apparatus with a cultivator, what I claim therein as new, and desire to secure by Letters Patent, is—

The combined operation of filling and discharging the revolving cup or cavities in the planting-rollers Z Z, by a single blow of the arms F F on said rollers, substantially as herein set forth.

EDSON HART.

Witnesses:
  Z. C. ROBBINS,
  A. STEINWEHR.